(12) United States Patent
Voo

(10) Patent No.: US 7,929,406 B1
(45) Date of Patent: Apr. 19, 2011

(54) POWER SAVING CIRCUIT

(75) Inventor: Thart Fah Voo, Singapore (SG)

(73) Assignee: Marvell International Ltd., Hamilton (BM)

( * ) Notice: Subject to any disclaimer, the term of this patent is extended or adjusted under 35 U.S.C. 154(b) by 412 days.

(21) Appl. No.: 11/777,758

(22) Filed: Jul. 13, 2007

Related U.S. Application Data

(60) Provisional application No. 60/831,804, filed on Jul. 19, 2006.

(51) Int. Cl.
*H02J 1/00* (2006.01)
(52) U.S. Cl. .......................................................... 370/36
(58) Field of Classification Search .................... 307/36, 307/77, 61
See application file for complete search history.

(56) References Cited

U.S. PATENT DOCUMENTS

| | | | |
|---|---|---|---|
| 7,375,502 B2 * | 5/2008 | Malherbe et al. | 323/268 |
| 7,594,127 B2 * | 9/2009 | Sutardja | 713/300 |
| 2007/0040601 A1 * | 2/2007 | Lee | 327/540 |

* cited by examiner

*Primary Examiner* — Michael Rutland Wallis

(57) ABSTRACT

A power saving circuit (PSC) may include a first circuit and a second circuit electrically coupled in series in a power sharing configuration. The PSC may further include a regulator that is electrically coupled to a first node when the first circuit requires less current or the second circuit supply current to the first node when the first circuit requires less current or the second circuit requires more current, and the regulator can remove current from the first node when the first circuit requires more current or the second circuit requires less current.

41 Claims, 5 Drawing Sheets

US 7,929,406 B1

POWER SAVING CIRCUIT

INCORPORATION BY REFERENCE

This application claims priority under 35 U.S.C. §119(e) from U.S. Provisional Application Ser. No. 60/831,804 filed on Jul. 19, 2006, incorporated by reference herein in its entirety.

BACKGROUND

The present disclosure relates to a power saving circuit, and more particularly to a power saving circuit capable of controlling an amount of current flowing through a load circuit by regulating a voltage of a node.

Power saving circuits are incorporated into a vast number of devices used in everyday life. For example, power saving circuits are used in automobile engines, cellular telephones, magnetic hard disk drives, fiber optic communication systems, and even children's toys.

Unfortunately, many power saving circuits suffer from such performance shortfalls as limited cross-talk control and interference decoupling. In a power sharing configuration, any variance in the power requirement of a first circuit may substantially vary the power available to a second circuit, thus having a detrimental effect on the operation of the second circuit. The variance in the power requirement of a circuit may be due to either a predetermined change in the operation of the circuit, manufacturing process variations, response to environmental circumstances, or the like.

Power saving circuits having limited cross-talk and interference control may not sufficiently lessen the effect of the variance of one circuit's power requirements on another circuit, and thus, result in improper operation of the circuits and inefficient use of power. Accordingly, it should be appreciated that, either due to the internal or external factors discussed above, a particular power saving circuit may cross-couple dynamic current or voltage fluctuations of one circuit to another to the detriment of the system incorporating the power saving circuit.

SUMMARY OF THE DISCLOSURE

A power saving circuit (PSC) is disclosed that includes a first circuit and a second circuit electrically coupled in series in a power sharing configuration. The PSC may further include a regulator that is electrically coupled to a first node between the first and second circuits. The regulator can supply current to the first node when the first circuit requires less current or the second circuit requires more current, and the regulator can remove current from the first node when the first circuit requires more current or the second circuit requires less current.

The regulator determines whether to supply or remove current by comparing a first reference voltage with a first node voltage, so that when the first node voltage is less than the first reference voltage, the regulator increases an amount of current supplied to the first node, and when the first node voltage is greater than the first reference voltage, the regulator decreases an amount of current supplied to the first node.

The PSC can further include a first voltage controlling circuit that is coupled between the first circuit and the first node, and a second voltage controlling circuit that is coupled between the first node and the second circuit. The first voltage controlling circuit can include a first transistor coupled in series between the first circuit and the first node, and a first amplifier having its non-inverting input coupled to a second reference voltage, its inverting input coupled to a second node between the first circuit and the first transistor, and its output coupled to the gate of the first transistor. Similarly, the second voltage controlling circuit can include a second transistor coupled in series between the second circuit and the first node, and a second amplifier having its non-inverting input coupled to a third reference voltage, its inverting input coupled to a third node between the second circuit and the first transistor, and its output coupled to the gate of the second transistor.

The first voltage controlling circuit compares the second reference voltage with a voltage of the second node, so that when the second node voltage is less than the second reference voltage, the first voltage controlling circuit increases a resistance between the source and drain of the first transistor, and when the second node voltage is greater than the second reference voltage, the first voltage controlling circuit decreases a resistance between the source and drain of the first transistor. Similarly, the second voltage controlling circuit compares the third reference voltage with a of the third node, so that when the third node voltage is less than the third reference voltage, the second voltage controlling circuit increases a resistance between the source and drain of the second transistor, and when the third node voltage is greater than the third reference voltage, the second voltage controlling circuit decreases a resistance between the source and drain of the second transistor.

BRIEF DESCRIPTION OF THE DRAWINGS

Embodiments of the power-saving circuit (PSC) will be described with reference to the following drawings, wherein like numerals designate like elements, and wherein.

DETAILED DESCRIPTION OF EMBODIMENTS

In the following descriptions, many of the exemplary circuits are shown to include n-channel metal-oxide-semiconductor field-effect transistors (MOSFETs) in a variety of configurations. While MOSFET devices are used by example, the disclosed circuits may be implemented using any number of other transistor types, such as J-FETs, bipolar transistors, and the like. Additionally, while n-channel devices are used in the following examples, the same general approaches may also apply to circuits incorporating p-channel FETs or PNP bipolar transistors, for example.

Still further, while the terms "drain" and "source" are used for ease of explanation and to adhere to traditional engineering usage, it should be recognized that a drain and source of a FET transistor may be considered interchangeable, and for the following descriptions merely thought of as a first end and a second end of a semiconductor channel unless otherwise stated or apparent to one of ordinary skill in the art.

Figure 1:
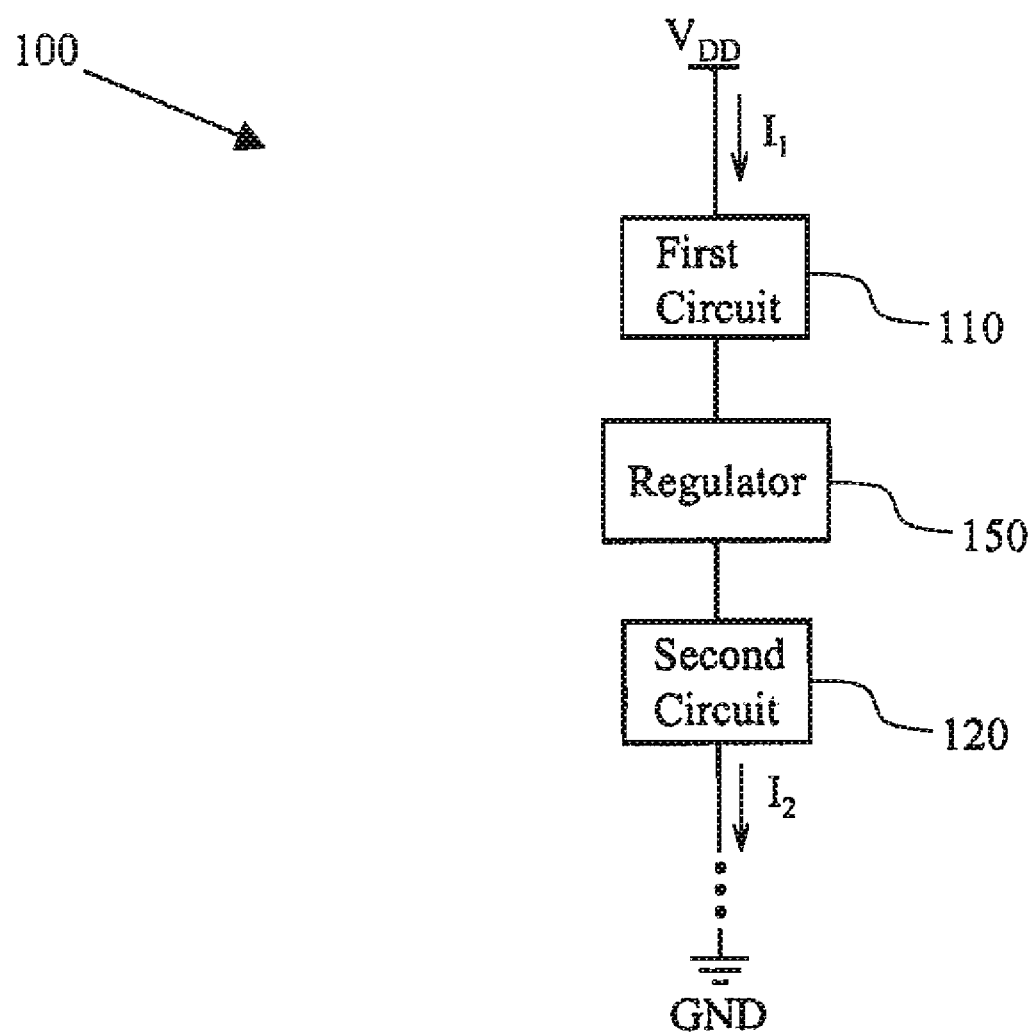
FIG. 1 shows a block diagram of an exemplary circuit configuration of PSC.

FIG. 1 shows a block diagram of an exemplary configuration of a power-saving circuit (PSC) 100 that may include a first circuit 110, a regulator 150, and a second circuit 120 coupled in series between a supply voltage $V_{DD}$ and a ground GND. Generally, the arrangement is a power sharing configuration between the first circuit 110 and second circuit 120. As can be seen, currents $I_1$ and $I_2$ are the electric currents flowing through first circuit 110 and second circuit 120, respectively.

In this configuration, regulator 150 can be any device that ensures that a voltage of at least one node (not shown) located between first circuit 110 and second circuit 120 is substantially constant during operation by regulating the amount of current flowing through that node. For example, a regulator 150 can include one or more voltage amplifiers, current amplifiers, operational amplifiers, transconductance amplifiers, transimpedance amplifiers, differential pairs, pulse width modulation devices, switching regulators, or the like. By regulating an amount of current at the node, the dynamic current usage of the first circuit 110 can be isolated from the second circuit 120, and vice versa. Thus, the operation of the first circuit 110 should not interfere with that of the second circuit 120, and vice versa.

It should be understood that first and second circuits 110 and 120 are not limited to any particular circuit and can be any digital, analog, or mixed signal load circuit including any combination of active and passive electronic devices or the like.

During operation, the PSC 100 operates to reduce or eliminate interference between first circuit 110 and second circuit 120, which can occur as a result of the power sharing configuration. For example, when first circuit 110 and second circuit 120 dynamically require more or less power, and therefore require more or less current, a change in the power requirements of the first circuit 110 can affect the current available to second circuit 120, and vice versa. By monitoring a voltage between first and second circuits 110 and 120, regulator 150 can adjust the current passing between the first and second circuits 110 and 120 so that dynamic current usage by first circuit 110 does not affect the current usage of second circuit 120, and vice versa.

While FIG. 1 only shows first and second circuits 110 and 120, and a single voltage regulator 150, it should be understood that any number of circuits may be provided with any number of voltage regulators. Furthermore, in order to facilitate ease of understanding, the operation of the exemplary embodiments of the PSC will be described with the assumption that first and second circuits 110 and 120 are treated as variable resistors.

Figure 2:
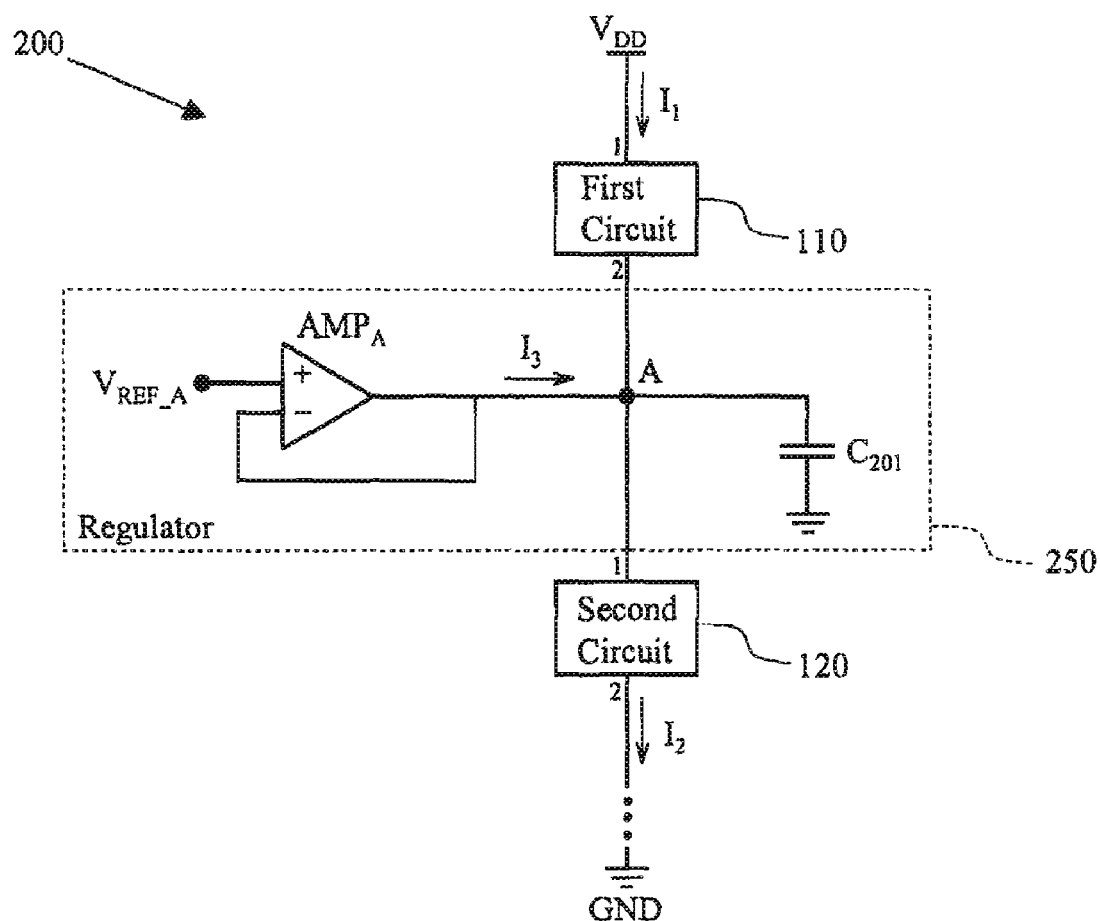
FIG. 2 shows a first exemplary PSC scheme.

As shown in FIG. 2, regulator 250, which corresponds to regulator 150, can include an amplifier $AMP_A$ and a capacitor $C_{201}$. In this case, amplifier $AMP_A$ of PSC 200 has a non-inverting terminal coupled to a reference voltage supply circuit (not shown) that applies a reference voltage $V_{REF\_A}$ to the non-inverting terminal. Further, both an inverting input terminal and an output terminal of amplifier $AMP_A$, as well as first circuit 110 and second circuit 120 are coupled together at node A. As also shown, capacitor $C_{201}$ can be coupled in series between node A and power supply GND in order to further stabilize the voltage at node A and also possibly to reduce or prevent any high frequency components of the current flowing through node A.

In the configuration shown in FIG. 2, amplifier $AMP_A$ maintains node A at a reference voltage $V_{REF\_A}$. As described above, during operation, first and second circuits 110 and 120 may dynamically require more or less power, and thus, more or less current. As the requirement for current of either one or both of first and second circuits 110 and 120 changes, these circuits adjust their respective equivalent resistance in order to change an amount of current they draw, and thus, change the voltage at node A. Amplifier $AMP_A$ senses this voltage change and adjusts the voltage at node A back to reference voltage $V_{REF\_A}$ by feeding or sinking an amount of electric current $I_3$ at node A.

For example, when first circuit 110 draws a first circuit $I_1$ from $V_{DD}$, second circuit 120 draws a second current $I_2$ from node A, and when first currents $I_1$ and $I_2$ are equal, the voltage at node A is equal to reference voltage $V_{REF\_A}$. Under these circumstances, because amplifier $AMP_A$ detects no change in the voltage at node A, it does not pass an additional third current $I_3$ through node A.

If, however, first circuit 110 requires more current, amplifier $AMP_A$ will sink third current $I_3$ from node A, and allow first circuit 110 to draw more current from $V_{DD}$, thus, satisfying first circuit's 110 need for more current while maintaining node A at reference voltage $V_{REF\_A}$. Specifically, when first circuit 110 requires more current, it will lower its equivalent resistance. Consequently, this will decrease the voltage drop across terminals 1 and 2 of first circuit 110, and thus, increase the voltage at node A to a voltage greater than $V_{REF\_A}$. Amplifier $AMP_A$ will sense that node A is at a voltage greater than $V_{REF\_A}$, and will begin to sink third current $I_3$ from node A.

In this case, first current $I_1$ will increase by an amount equivalent to third current $I_3$. The increase of first current $I_1$ will increase the voltage drop across terminals 1 and 2 of first circuit 110, and, as a result, lower the voltage at node A back to reference voltage $V_{REF\_A}$. Accordingly, second current $I_2$ will remain substantially unchanged because the additional current that first circuit 110 will be drawing from $V_{DD}$ will be drawn out by amplifier $AMP_A$ at node A. This situation results in a relationship between $I_1$, $I_2$, and $I_3$ illustrated by equation (1) shown below.

$$I_1 = I_2 + I_3 \qquad (1)$$

On the other hand, if first circuit 110 requires less current, amplifier $AMP_A$ will feed third current $I_3$ into node A, and allow first circuit 110 to draw less current from $V_{DD}$, thus, satisfying first circuit's 110 need for less current while maintaining node A at reference voltage $V_{REF\_A}$. Specifically, when first circuit requires less current, it will increase its equivalent resistance. Consequently, this will increase the voltage drop across terminals 1 and 2 of first circuit 110, and thus, lower the voltage at node A to a voltage less than $V_{REF\_A}$. Amplifier $AMP_A$ will sense that node A is at a voltage less than $V_{REF\_A}$, and will begin to feed third current $I_3$ into node A.

In this case, first current $I_1$ will decrease by an amount equivalent to third current $I_3$. The decrease of first current $I_1$ will decrease the voltage drop across terminals 1 and 2 of first circuit 110, and, as a result, raise the voltage at node A back to reference voltage $V_{REF\_A}$. Accordingly, second current $I_2$ will remain substantially unchanged because amplifier $AMP_A$ will supply second circuit 120 to compensate for the reduction in first current $I_1$ passing through first circuit 110. This situation results in a relationship between $I_1$, $I_2$, and $I_3$ illustrated by equation (2) shown below.

$$I_1 = I_2 - I_3 \qquad (2)$$

When second circuit 120 requires more current, amplifier $AMP_A$ will feed third current $I_3$ into node A, and allow second circuit 120 to draw more current from node A, thus, satisfying second circuit's 120 need for more current while maintaining node A at reference voltage $V_{REF\_A}$. Specifically, when second circuit requires more current, it will lower its equivalent resistance. Consequently, this will decrease the voltage drop across terminals 1 and 2 of second circuit 120, and thus, lower the voltage at node A to a voltage less than $V_{REF\_A}$. Amplifier $AMP_A$ will sense that node A is at a voltage less than $V_{REF\_A}$, and will begin to feed third current $I_3$ into node A.

In this case, second current $I_2$ will increase by an amount equivalent to third current $I_3$. The increase of second current $I_2$ will increase the voltage drop across terminals 1 and 2 of second circuit 120, and, as a result, increase the voltage at node A back to reference voltage $V_{REF\_A}$. Accordingly, first current $I_1$ will remain substantially unchanged because the additional current required by second circuit 120 will be supplied by amplifier AMP$_A$ via node A. This situation results in a relationship between $I_1$, $I_2$, and $I_3$ illustrated by equation (3) shown below.

$$I_2 = I_1 + I_3 \qquad (3)$$

Conversely, when second circuit 120 requires less current, amplifier AMP$_A$ will sink third current $I_3$ from node A, and allow second circuit 120 to draw less current from node A, thus, satisfying second circuit's 120 need for less current while maintaining node A at reference voltage $V_{REF\_A}$. Specifically, when second circuit requires less current, it will raise its equivalent resistance. Consequently, this will raise the voltage drop across terminals 1 and 2 of second circuit 120, and thus, raise the voltage at node A to a voltage greater than $V_{REF\_A}$. Amplifier AMP$_A$ will sense that node A is at a voltage greater than $V_{REF\_A}$, and will begin to sink third current $I_3$ from node A.

In this case, second current $I_2$ will decrease by an amount equivalent to third current $I_3$. The decrease of second current $I_2$ will decrease the voltage drop across terminals 1 and 2 of second circuit 120, and, as a result, lower the voltage at node A back to reference voltage $V_{REF\_A}$. Accordingly, first current $I_1$ will remain substantially unchanged because the additional current not used by second circuit 120 will be drawn out of node A via amplifier AMP$_A$. This situation results in a relationship between $I_1$, $I_2$, and $I_3$ illustrated by equation (4) shown below.

$$I_2 = I_1 - I_3 \qquad (4)$$

Figure 3:
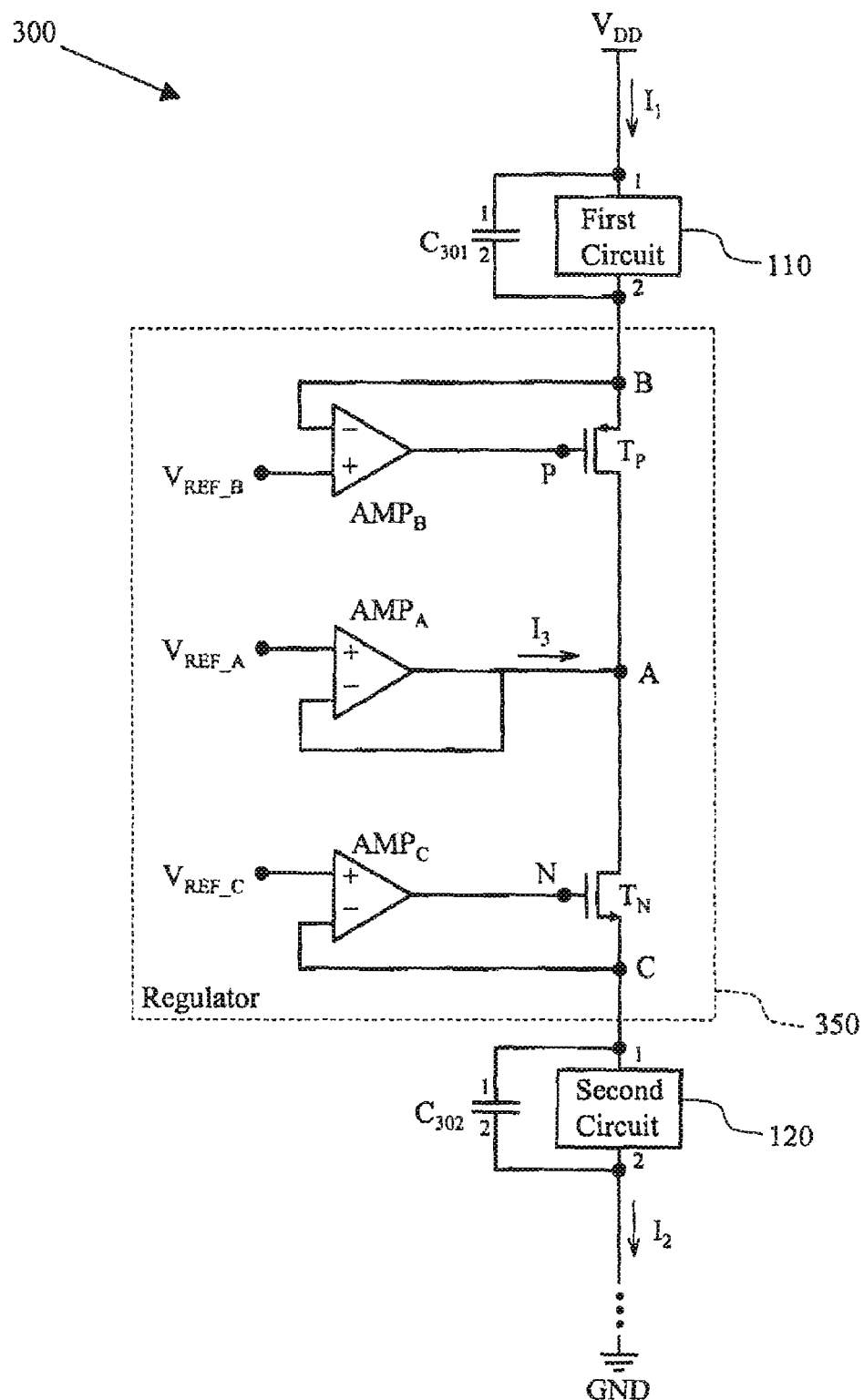
FIG. 3 shows a second exemplary PSC scheme.

FIG. 3 shows an exemplary schematic diagram of PSC 300 that includes first circuit 110, second circuit 120, transistors $T_P$ and $T_N$, capacitors $C_{301}$ and $C_{302}$, and amplifiers AMP$_A$, AMP$_B$, and AMP$_C$. PSC 300 includes nodes A, B, C, P, and N. As shown, node A couples drain terminals of transistors $T_P$ and $T_N$ and an inverting input terminal and an output terminal of AMP$_A$; node B couples second terminals of first circuit 110 and capacitor $C_{301}$, a source terminal of transistor $T_P$, and an inverting input terminal of amplifier AMP$_B$; node C couples first terminals of second circuit 120 and capacitor $C_{302}$, a source terminal of transistor $T_N$, and an inverting input terminal of amplifier AMP$_C$; node P couples an output terminal of amplifier AMP$_B$ and a gate terminal of transistor $T_P$; and node N couples an output terminal of amplifier AMP$_C$ and a gate terminal of transistor $T_N$. A reference voltage supply circuit (not shown) is coupled to and applies reference voltages $V_{REF\_A}$, $V_{REF\_B}$, and $V_{REF\_C}$ to non-inverting terminals of amplifiers AMP$_A$, AMP$_B$, and AMP$_C$, respectively. First terminals of first circuit 110 and capacitor $C_{301}$ are coupled to $V_{DD}$; and second terminals of second circuit 120 and capacitor $C_{302}$ are coupled to GND.

Capacitors $C_{301}$ and $C_{302}$ can be added in order to reduce or prevent the high frequency noise components of first and second currents $I_1$ and $I_2$, respectively.

Reference voltages $V_{REF\_A}$, $V_{REF\_B}$, and $V_{REF\_C}$ are the voltages at which amplifiers AMP$_A$, AMP$_B$, and AMP$_C$ maintain nodes A, B, and C, respectively. It should be understood that the reference voltages can be set to various voltages depending on circuit design parameters.

Transistors $T_P$ and $T_N$ and amplifiers AMP$_A$, AMP$_B$, and AMP$_C$ compose a regulator 350. Regulator 350 is similar to regulator 250 in that it includes amplifier AMP$_A$ for regulating the voltage at node A. Regulator 350, however, differs from regulator 250 in that it additionally includes transistors $T_P$ and $T_N$ coupled to amplifiers AMP$_B$ and AMP$_C$, respectively, for isolating first circuit 110 from second circuit 120 and regulating the voltages at nodes B and C. Because the voltages at nodes B and C are regulated, voltage variations at node A have a very minimal effect on the voltages at nodes B and C. Thus, with minimal voltage variations at nodes B and C, the currents through transistors $T_P$ and $T_N$, and hence the currents through first and second circuits 110 and 120, can remain substantially constant.

For example, during operation, when first circuit 110 requires more current, it will lower its equivalent resistance. As a result, this will decrease the voltage drop across terminals 1 and 2 of first circuit 110 and increase the voltage at node B to a voltage greater than $V_{REF\_B}$. Amplifier AMP$_B$ will sense that node B is at a voltage greater than $V_{REF\_B}$, and will decrease the voltage at node P so as to lower the channel resistance of transistor $T_P$ and pull down the voltage at node B to reference voltage $V_{REF\_B}$. Lowering the channel resistance of transistor $T_P$, however, will decrease the voltage drop across the source and drain of transistor $T_P$, and thus, raise the voltage at node A. This, in turn, will trigger AMP$_A$ to sink third current $I_3$ from node A in order to pull the voltage at node A back down to $V_{REF\_A}$.

During the period when the voltage at node A is pulled up, the voltage at node C may begin to rise. However, AMP$_C$ will sense the change in the voltage at node C and, due to its high gain response, will immediately adjust the channel resistance of transistor $T_N$ so as to pull the voltage at node C back down to reference voltage $V_{REF\_C}$. In this manner, amplifier AMP$_C$ will maintain the voltage at node C at reference voltage $V_{REF\_C}$ to reduce or prevent fluctuation of second current $I_2$ flowing through second circuit 120.

First current $I_1$, however, will increase by an amount equivalent to third current $I_3$, satisfying first circuit's 110 requirement for more current, and resulting in a relationship between $I_1$, $I_2$, and $I_3$ illustrated by equation (1) shown above.

On the other hand, when first circuit 110 requires less current, it will raise its equivalent resistance. As a result, this will increase the voltage drop across terminals 1 and 2 of first circuit 110 and decrease the voltage at node B to a voltage less than $V_{REF\_B}$. Amplifier AMP$_B$ will sense that node B is at a voltage less than $V_{REF\_B}$, and will increase the voltage at node P so as to raise the channel resistance of transistor $T_P$ and pull up the voltage at node B to reference voltage $V_{REF\_B}$. Raising the channel resistance of transistor $T_P$, however, will increase the voltage drop across the source and drain of transistor $T_P$, and thus, lower the voltage at node A. This, in turn, will trigger AMP$_A$ to feed third current $I_3$ into node A in order to pull the voltage at node A back up to $V_{REF\_A}$.

During the period when the voltage at node A is pulled down, the voltage at node C may begin to fall. However, AMP$_C$ will sense the change in the voltage at node C and, due to its high gain response, will immediately adjust the channel resistance of transistor $T_N$ so as to pull the voltage at node C back up to reference voltage $V_{REF\_C}$. In this manner, amplifier AMP$_C$ will maintain the voltage at node C at reference voltage $V_{REF\_C}$ to prevent or reduce fluctuation of second current $I_2$ flowing through second circuit 120.

First current $I_1$, however, will decrease by an amount equivalent to third current $I_3$, satisfying first circuit's 110 requirement for less current, which results in a relationship between $I_1$, $I_2$, and $I_3$ illustrated by equation (2) shown above.

When second circuit 120 requires more current, it will lower its equivalent resistance. As a result, this will decrease the voltage drop across terminals 1 and 2 of second circuit 120 and decrease the voltage at node C to a voltage less than $V_{REF\_C}$. Amplifier $AMP_C$ will sense that node C is at a voltage less than $V_{REF\_C}$, and will increase the voltage at node N so as to lower the channel resistance of transistor $T_N$ and pull up the voltage at node C to reference voltage $V_{REF\_C}$. Lowering the channel resistance of transistor $T_N$, however, will decrease the voltage drop across the source and drain of transistor $T_N$, and thus, lower the voltage at node A. This, in turn, will trigger $AMP_A$ to feed third current $I_3$ into node A in order to pull the voltage at node A back down to $V_{REF\_A}$.

During the period when the voltage at node A is pulled down, the voltage at node B may begin to fall. However, $AMP_B$ will sense the change in the voltage at node B and, due to its high gain response, will immediately adjust the channel resistance of transistor $T_P$ so as to pull the voltage at node B back up to reference voltage $V_{REF\_B}$. In this manner, amplifier $AMP_B$ will maintain the voltage at node B at reference voltage $V_{REF\_B}$ to prevent or reduce fluctuation of first current $I_1$ flowing through first circuit 110.

Second current $I_2$, however, will increase by an amount equivalent to third current $I_3$, satisfying second circuit's 120 requirement for more current, which results in a relationship between $I_1$, $I_2$, and $I_3$ illustrated by equation (3) shown above.

Conversely, when second circuit 120 requires less current, it will raise its equivalent resistance. As a result, this will increase the voltage drop across terminals 1 and 2 of second circuit 120 and increase the voltage at node C to a voltage greater than $V_{REF\_C}$. Amplifier $AMP_C$ will sense that node C is at a voltage greater than $V_{REF\_C}$, and will decrease the voltage at node N so as to increase the channel resistance of transistor $T_N$ and pull up the voltage at node C to reference voltage $V_{REF\_C}$. Increasing the channel resistance of transistor $T_N$, however, will increase the voltage drop across the source and drain of transistor $T_N$, and thus, increase the voltage at node A. This, in turn, will trigger $AMP_A$ to sink third current $I_3$ from node A in order to pull the voltage at node A back down to $V_{REF\_A}$.

During the period when the voltage at node A is pulled up, the voltage at node B may begin to rise. However, $AMP_B$ will sense the change in the voltage at node B and, due to its high gain response, will immediately adjust the channel resistance of transistor $T_P$ so as to pull the voltage at node B back down to reference voltage $V_{REF\_B}$. In this manner, amplifier $AMP_B$ will maintain the voltage at node B at reference voltage $V_{REF\_B}$ to prevent or reduce fluctuation of first current $I_1$ flowing through first circuit 110.

Second current $I_2$, however, will decrease by an amount equivalent to third current $I_3$, satisfying second circuit's 120 requirement for less current, which results in a relationship between $I_1$, $I_2$, and $I_3$ illustrated by equation (4) shown above.

Figure 4:
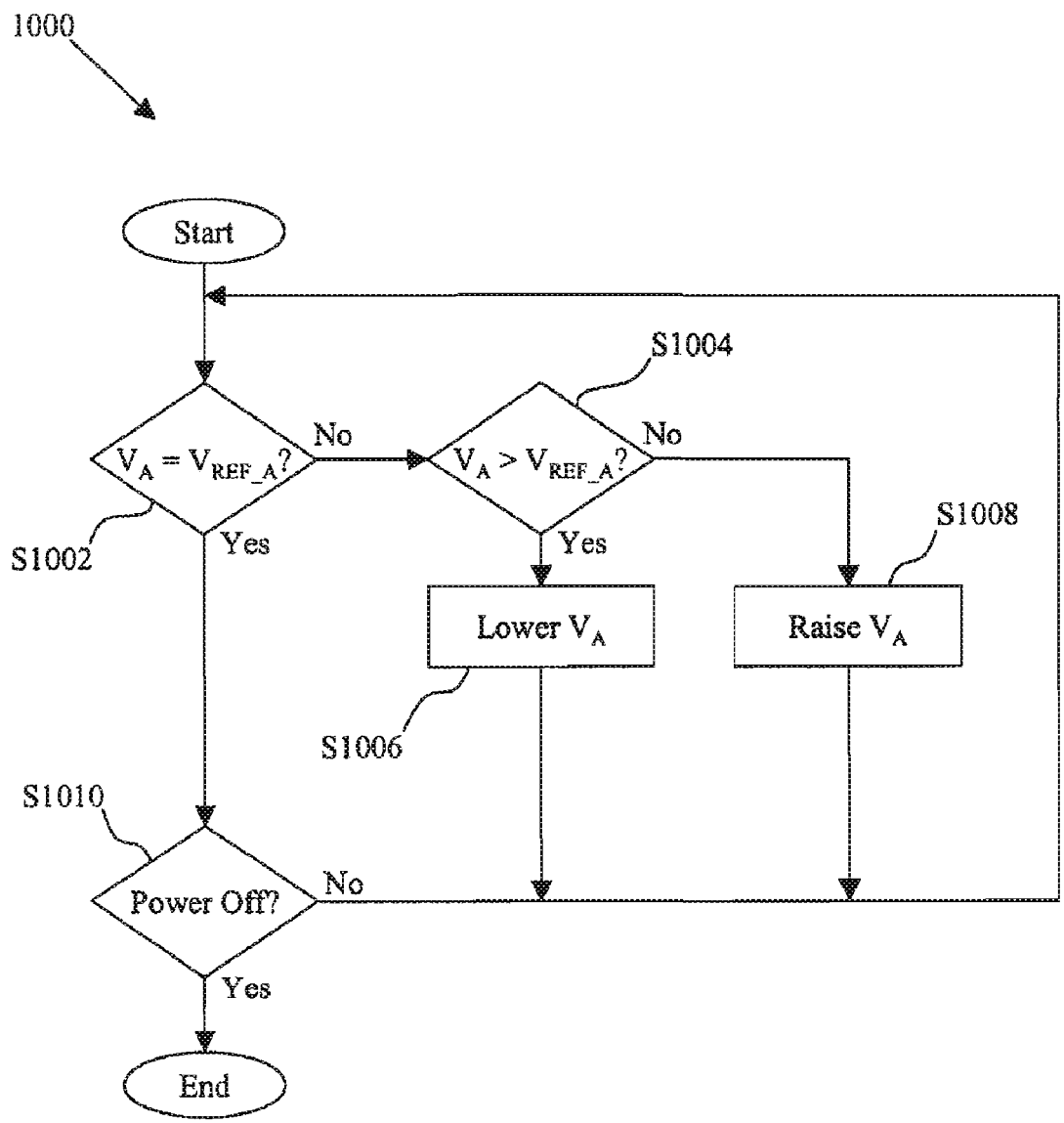
FIG. 4 shows a flow-chart of an exemplary PSC process for regulating voltage at one node.

FIG. 4 shows a flow-chart 1000 of an exemplary PCS process. The exemplary PSC process can be implemented in a circuit where dynamic current usage of one component needs to be isolated from another component, such as the PSC circuit shown in FIG. 2.

The process begins and proceeds to step S1002 where a determination is made as to whether a voltage $V_A$ is equal to reference voltage $V_{REF\_A}$. If voltage $V_A$ is determined to not be equal to reference voltage $V_{REF\_A}$, then the process proceeds to step S1004. Otherwise, the process proceeds to step S1010.

In step S1004, a determination is made as to whether voltage $V_A$ is greater than reference voltage $V_{REF\_A}$. If voltage $V_A$ is determined to be greater than reference voltage $V_{REF\_A}$, then the process proceeds to step S1006. Otherwise, the process proceeds to step S1008.

In step S1008, the process raises voltage $V_A$ and returns to step S1002. In step S1006, the process lowers voltage $V_A$ and returns to step S1002. For example, in PSC 200, regulator 250 increases the voltage at node A if the voltage at node A is less than reference voltage $V_{REF\_A}$, and decreases the voltage at node A if the voltage at node A is greater than reference voltage $V_{REF\_A}$.

In step S1010, the process determines whether the PSC is powered off. If the PSC is not powered off, then the process returns to step S1002. Otherwise, the process ends.

Figure 5:
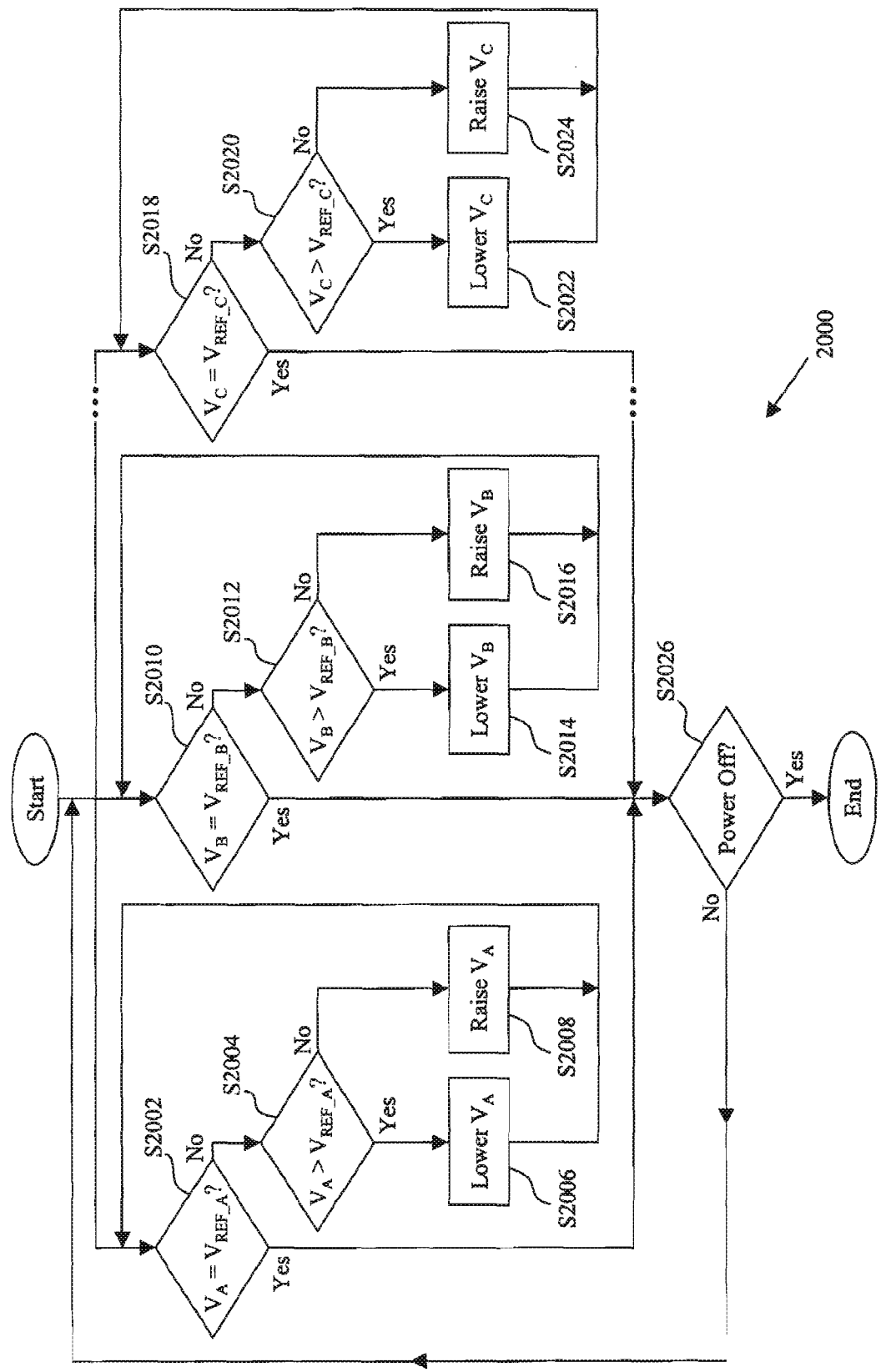
FIG. 5 shows a flow-chart of an exemplary PSC process for regulating voltage at more than one node.

FIG. 5 shows a flow-chart 2000 of an exemplary PSC process for regulating voltage at more than one node. The exemplary PSC process can be implemented in a circuit where dynamic current usage of one or more components needs to be isolated from another component, such as the PSC circuit shown in FIG. 3.

The process begins and proceeds to steps S2002, S2010, and S2018. In step S2002 a determination is made as to whether voltage $V_A$ is equal to reference voltage $V_{REF\_A}$. If voltage $V_A$ is determined to not be equal to reference voltage $V_{REF\_A}$, then the process proceeds to step S2004. Otherwise, the process proceeds to step S2026.

In step S2004, a determination is made as to whether voltage $V_A$ is greater than reference voltage $V_{REF\_A}$. If voltage $V_A$ is determined to be greater than reference voltage $V_{REF\_A}$, then the process proceeds to step S2006. Otherwise, the process proceeds to step S2008.

In step S2008, the process raises voltage $V_A$ and returns to step S2002. In step S2006, the process lowers voltage $V_A$ and returns to step S2002. For example, in PSC 300, regulator 350 increases the voltage at node A if the voltage at node A is less than reference voltage $V_{REF\_A}$, and decreases the voltage at node A if the voltage at node A is greater than reference voltage $V_{REF\_A}$.

In step S2010 a determination is made as to whether voltage $V_B$ is equal to reference voltage $V_{REF\_B}$. If voltage $V_B$ is determined to not be equal to reference voltage $V_{REF\_B}$, then the process proceeds to step S2012. Otherwise, the process proceeds to step S2026.

In step S2012, a determination is made as to whether voltage $V_B$ is greater than reference voltage $V_{REF\_B}$. If voltage $V_B$ is determined to be greater than reference voltage $V_{REF\_B}$, then the process proceeds to step S2014. Otherwise, the process proceeds to step S2016.

In step S2016, the process raises voltage $V_B$ and returns to step S2010. In step S2014, the process lowers voltage $V_B$ and returns to step S2010. For example, in PSC 300, regulator 350 increases the voltage at node B if the voltage at node B is less than reference voltage $V_{REF\_B}$, and decreases the voltage at node B if the voltage at node B is greater than reference voltage $V_{REF\_B}$.

In step S2018 a determination is made as to whether voltage $V_C$ is equal to reference voltage $V_{REF\_C}$. If voltage $V_C$ is determined to not be equal to reference voltage $V_{REF\_C}$, then the process proceeds to step S2020. Otherwise, the process proceeds to step S2026.

In step S2020, a determination is made as to whether voltage $V_C$ is greater than reference voltage $V_{REF\_C}$. If voltage $V_C$ is determined to be greater than reference voltage $V_{REF\_C}$, then the process proceeds to step S2022. Otherwise, the process proceeds to step S2024.

In step S2024, the process raises voltage $V_C$ and returns to step S2018. In step S2022, the process lowers voltage $V_C$ and returns to step S2018. For example, in PSC 300, regulator 350 increases the voltage at node C if the voltage at node C is less than reference voltage $V_{REF\_C}$, and decreases the voltage at node C if the voltage at node C is greater than reference voltage $V_{REF\_C}$.

In step S2026, the process determines whether the PSC is powered off. If the PSC is not powered off, then the process returns to steps S2002, S2010, and S2018. Otherwise, the process ends.

It should be understood that additional steps can be added where a determination is made as to whether a voltage at one or more additional nodes is equal to its respective reference voltage and is adjusted in a manner similar to that described above in steps S2002 through S2026.

Voltages $V_A$, $V_B$, and $V_C$ can be regulated either independently, simultaneously, or sequentially in a temporally overlapping or non-overlapping manner. For example, in PSC 300, when first circuit 110 requires more current, the voltage at node B will be adjusted first. However, after amplifier $AMP_B$ begins adjusting the voltage at node B, amplifier $AMP_C$ may start adjust the voltage at node C prior to when amplifier $AMP_A$ begins to sink third current $I_3$ from node A to adjust the voltage at node A.

For purposes of explanation, in the above description, numerous specific details are set forth in order to provide a thorough understanding of the PSC. It will be apparent, however, to one skilled in the art that the PSC can be practiced without these specific details. In other instances, well-known structures and devices are shown in block diagram form in order to avoid obscuring the PSC.

While the PSC has been described in conjunction with the specific embodiments thereof, it is evident that many alternatives, modifications, and variations will be apparent to those skilled in the art. Accordingly, embodiments of the PSC as set forth herein are intended to be illustrative, not limiting. There are changes that may be made without departing from the spirit and scope of the invention.

What is claimed is:

1. An isolation device that isolates a plurality of load circuits connected in series between two power sources, comprising:
    a node between a first load circuit and a second load circuit, wherein
    a power requirement of the first load circuit substantially varies power available to the second load circuit, and amounts of currents drawn to the first and second load circuits are dynamically changing with respect to each other; and
    a power source circuit regulating a voltage of the node, the power source circuit determines a first current requirement of the first load circuit and a second current requirement of the second load circuit that is different from the first current requirement and supplies current to the node when the first load circuit requires less current or the second load circuit requires more current, and removes current from the node when the first load circuit requires more current or the second load circuit requires less current.

2. The isolation device according to claim 1, wherein the node is a first node, further comprising:
    a second node between the first node and the first load circuit; and
    a first voltage regulating circuit regulating a second voltage at the second node, the second voltage having a first predetermined relationship with the first voltage of the first node.

3. The isolation device according to claim 2, further comprising:
    a third node between the first node and a second load circuit; and
    a second voltage regulating circuit regulating a third voltage at the third node, the third voltage having a second predetermining relationship with the first voltage of the first node.

4. The isolation device according to claim 2, the first voltage regulating circuit further comprising:
    a circuit that is connected in series between the first node and the second node, the circuit maintaining the second voltage at the second node.

5. The isolation device according to claim 4, wherein the circuit that is connected in series between the first node and the second node has a variable resistance.

6. The isolation device according to claim 4, wherein the circuit is a transistor.

7. The isolation device according to claim 6, wherein the transistor is either a MOSFET transistor or a bipolar transistor.

8. The isolation device according to claim 6, wherein the transistor is selected from one or more of:
    MOSFET transistors having gates as control terminals and sources and drains as first and second power terminals, respectively; and
    bipolar transistors having bases as control terminals and collectors and emitters as first and second power terminals, respectively.

9. The isolation device according to claim 8, wherein the first voltage regulating circuit further comprises an amplifier having an inverting input coupled to the second node and an output coupled to the control terminal of the transistor.

10. The isolation device according to claim 9, wherein a non-inverting input of the amplifier receives a reference voltage corresponding to the predetermined relationship between the second node and the first node.

11. The isolation device according to claim 3, the second voltage regulating circuit further comprising:
    a circuit that is connected in series between the first node and the third node, the circuit maintaining the third voltage at the third node.

12. The isolation device according to claim 11, wherein the circuit that is connected in series between the first node and the third node has a variable resistance.

13. The isolation device according to claim 11, wherein the circuit is a transistor.

14. The isolation device according to claim 13, wherein the transistor is either a MOSFET transistor or a bipolar transistor.

15. The isolation device according to claim 13, wherein the transistor is selected from one or more of:
    MOSFET transistors having gates as control terminals and sources and drains as first and second power terminals, respectively; and
    bipolar transistors having bases as control terminals and collectors and emitters as first and second power terminals, respectively.

16. The isolation device according to claim 15, wherein the second voltage regulating circuit further comprises an amplifier having an inverting input coupled to the third node and an output coupled to the control terminal of the transistor.

17. The isolation device according to claim 16, wherein a non-inverting input of the amplifier receives a reference voltage corresponding to the predetermined relationship between the third node and the first node.

18. An isolation device comprising:
    a first circuit having a first current;

a second circuit that is electrically coupled in series with the first circuit and having a second current; and a regulator that is electrically coupled to a node between the first and second circuits, the regulator determining a first current requirement of the first circuit and a second current requirement of the second circuit that is different from the first current requirement and supplying current to the node when the first circuit requires less current or the second circuit requires more current, and the regulator removing current from the node when the first circuit requires more current or the second circuit requires less current, wherein a power requirement of the first circuit substantially varies power available to the second circuit, and amounts of currents drawn to the first and second circuits are dynamically changing with respect to each other.

19. The isolation device according to claim 18, further comprising:

a first voltage regulating circuit that couples the first circuit to the node; and a second voltage regulating circuit that couples the second circuit to the node.

20. The isolation device according to claim 19, the first voltage regulating circuit including a first device having a variable resistance that is coupled in series between the first circuit and the node, and the second voltage regulating circuit including a second device having a variable resistance that is coupled in series between the node and the second circuit.

21. The isolation device according to claim 10, each of the first and second voltage regulating circuits including an amplifier and a transistor.

22. The isolation device according to claim 19, wherein the first voltage regulating circuit includes a first transistor having a first power terminal coupled to the first circuit and a second power terminal coupled to the node, and the second voltage regulating circuit includes a second transistor having a second power terminal coupled to the node and a first power terminal coupled to the second circuit.

23. The isolation device according to claim 22, wherein the first voltage regulating circuit further includes a first amplifier having a non-inverting input coupled to a second reference voltage, an inverting input coupled to the second power terminal of the first transistor, and an output of the first amplifier coupled to a control terminal of the first transistor, and the second voltage regulating circuit further includes a second amplifier having a non-inverting input coupled to a third reference voltage, an inverting input coupled to the first power terminal of the second transistor, and an output of the second amplifier coupled to control terminal of the second transistor.

24. The isolation device according to claim 23, wherein the node is a first node, wherein the first voltage regulating circuit compares the second reference voltage with a second node voltage of a second node located between the first circuit and the first voltage regulating circuit, so that when the second node voltage is less than the second reference voltage, the first voltage regulating circuit increases a resistance between the first and second power terminals of the first transistor, and when the second node voltage is greater than the second reference voltage, the first voltage regulating circuit decreases a resistance between the first and second power terminals of the first transistor.

25. The isolation device according to claim 24, wherein the second voltage regulating circuit compares the third reference voltage with a third node voltage of a third node located between the second voltage regulating circuit and the second circuit, so that when the third node voltage is less than the third reference voltage, the second voltage regulating circuit increases a resistance between the first and second power terminals of the second transistor, and when the third node voltage is greater than the third reference voltage, the second voltage regulating circuit decreases a resistance between the first and second power terminals of the second transistor.

26. A method of isolating a first and second load circuit connected in series between two power sources, comprising:

comparing a voltage at a node located between the first and second load circuits with a first reference voltage;

controlling the voltage of the node to correspond to the first reference voltage when the first voltage at the node differs from the first reference voltage;

determining a first current requirement of the first load circuit and a second current requirement of the second load circuit that is different from the first current requirement and supplying current to the node when the first load circuit requires less current or the second load circuit requires more current; and removing current from the node when the first load circuit requires more current or the second load circuit requires less current, wherein a power requirement of the first load circuit substantially varies power available to the second load circuit, and amounts of currents drawn to the first and second load circuits are dynamically changing with respect to each other.

27. The method of isolating according to claim 26, wherein the node is a first node, wherein the voltage is a first voltage, further comprising:

comparing a second voltage at a second node located between the first node and a first load circuit with a second reference voltage; and controlling the second voltage of the second node to correspond to the second reference voltage when the second voltage at the second node differs from the second reference voltage.

28. The method of isolating according to claim 27, further comprising:

comparing a third voltage at a third node located between the first node and a second load circuit with a third reference circuit; and controlling the third voltage of the third node to correspond to the third reference voltage when the third voltage at the third node differs from the third reference voltage.

29. The method of isolating according to claim 26, wherein the node is a first node, wherein the voltage is a first voltage, further comprising:

comparing a second voltage at a second node located between the first node and a first load circuit with a second reference voltage;

controlling the second voltage of the second node to correspond to the second reference voltage when the second voltage at the second node differs from the second reference voltage;

comparing a third voltage at a third node located between the first node and a second load circuit with a third reference voltage; and controlling the third voltage of the third node to be same as the third reference voltage when the third voltage at the third node differs from the third reference voltage.

30. The method of isolating according to claim 29, further comprising:

controlling the second voltage of the second node by varying a first resistance that is coupled between the second node and the first node; and controlling the third voltage of the third node by varying a second resistance that is coupled between the first node and the third node.

31. A method for forming an isolation device, comprising:

connecting a first and second load circuit in series between two power sources;

connecting a power source circuit to a node located between the first and second load circuits;

providing one or more regulating circuits to control a voltage of the node;

determining by the power source circuit a first current requirement of the first load circuit and a second current requirement of the second load circuit that is different from the first current requirement and supplying current to the node when the first load circuit requires less current or the second load circuit requires more circuit; and removing by the power source circuit current from the node when the first load circuit requires more current or the second load circuit requires less current, wherein a power requirement of the first load circuit substantially varies power available to the second load circuit, and amounts of currents drawn to the first and second load circuits are dynamically changing with respect to each other.

32. The method for forming an isolation device according to claim 31, wherein the node is a first node, wherein the voltage is a first voltage, comprising:

connecting a first voltage controlling circuit to a second node located between the first load circuit and the first voltage controlling circuit; and providing one or more regulating circuits to control a second voltage at the second node to have a predetermined relationship with the first voltage of the first node.

33. The method for forming an isolation device according to claim 31, wherein the node is a first node, wherein the voltage is a first voltage, comprising:

connecting a second voltage controlling circuit to a third node located between the second load circuit and the second voltage controlling circuit; and providing one or more regulating circuits to control a third voltage at a second node to have a predetermined relationship with the first voltage of the first node.

34. The method for forming an isolation device according to claim 32, comprising:

providing the first voltage controlling circuit with a first transistor having a source that is coupled to the second node and a drain that is coupled to the first node.

35. The method for forming an isolation device according to claim 34, comprising:

providing the first voltage controlling circuit with a first amplifier having an inverting input coupled to the second node and an output coupled to a gate of the transistor.

36. The method for forming an isolation device according to claim 33, comprising:

providing the second voltage controlling circuit with a second transistor having a source that is coupled to the third node and a drain that is coupled to the first node.

37. The method for forming an isolation device according to claim 36, comprising:

providing the second voltage controlling circuit with a second amplifier having an inverting input coupled to the third node and an output coupled to a gate of the second transistor.

38. The isolation device according to claim 1, wherein the node is a first node, further comprising:

a first voltage regulating circuit including a first amplifier having an inverting input coupled to a second node and an output coupled to a control terminal of a first transistor; and a second voltage regulating circuit including a second amplifier having an inverting input coupled to a third node and an output coupled to a control terminal of a second transistor, wherein the third node is positioned between the first node and second load circuits.

39. The isolation device according to claim 18, wherein the node is a first node, further comprising:

a first voltage regulating circuit including a first amplifier having an inverting input coupled to a second node and an output coupled to a control terminal of a first transistor; and a second voltage regulating circuit including a second amplifier having an inverting input coupled to a third node and an output coupled to a control terminal of a second transistor, wherein the third node is positioned between the first node and second load circuits.

40. The method of isolating according to claim 26, wherein the node is a first node, further comprising:

regulating a first voltage by a first voltage regulating circuit that includes a first amplifier having an inverting input coupled to a second node and an output coupled to a control terminal of a first transistor; and regulating a second voltage by a second voltage regulating circuit that includes a second amplifier having an inverting input coupled to a third node and an output coupled to a control terminal of a second transistor, wherein the third node is positioned between the first node and second load circuits.

41. The method of forming an isolation device according to claim 31, wherein the node is a first node, further comprising:

providing a first voltage regulating circuit that includes a first amplifier having an inverting input coupled to a second node and an output coupled to a control terminal of a first transistor; and providing a second voltage regulating circuit that includes a second amplifier having an inverting input coupled to a third node and an output coupled to a control terminal of a second transistor, wherein the third node is positioned between the first node and second load circuits.

* * * * *